United States Patent [19]

Hutton et al.

[11] 4,086,304

[45] Apr. 25, 1978

[54] ORGANIC TRIPHOSPHITES HAVING IMPROVED HYDROLYTIC STABILITY AND A PROCESS FOR STABILIZING ORGANIC TRIPHOSPHITES

[75] Inventors: Ronald Eric Hutton, Southport; David Frederic Watson Cross, Liverpool, both of England

[73] Assignee: Akzona Incorporated, Asheville, N.C.

[21] Appl. No.: 695,112

[22] Filed: Jun. 11, 1976

[30] Foreign Application Priority Data

Jun. 12, 1975 Netherlands .......................... 7506988

[51] Int. Cl.$^2$ .......................... C07F 9/141; C07F 9/15
[52] U.S. Cl. ................................ 260/989; 260/927 R; 260/936; 260/937; 260/967
[58] Field of Search ............ 260/989, 967, 937, 927 A

[56] References Cited

U.S. PATENT DOCUMENTS

| 3,553,298 | 1/1971 | Hodan et al. .......................... 260/989 |
| 3,755,200 | 8/1973 | Rhodes et al. ............... 260/45.7 PH |

*Primary Examiner*—Anton H. Sutto
*Attorney, Agent, or Firm*—Stevens, Davis, Miller & Mosher

[57] ABSTRACT

A hydrolytically stable composition contains as its essential components at least about 85% by weight of an organic triphosphite and from about 0.1% to 5% by weight of a salt of a metal from Group I or Group II of the Periodic System and an organic acid having at least 8 carbon atoms. An organic triphosphite can be stabilized against hydrolytic degradation in accordance with the invention by mixing from about 0.1% to 5% by weight of the said salt therewith.

16 Claims, No Drawings

ORGANIC TRIPHOSPHITES HAVING IMPROVED HYDROLYTIC STABILITY AND A PROCESS FOR STABILIZING ORGANIC TRIPHOSPHITES

This invention relates generally to organic triphosphites and more particularly to an organic triphosphite having improved hydrolytic stability and to a method of improving the hydrolytic stability of organic triphosphites.

It has been recognized that the hydrolytic stability of organic triphosphites leaves something to be desired. It has therefore been proposed to prepare special organic triphosphites such as those disclosed in Canadian Pat. No. 770,163 and in Belgian Pat. No. 770,865 to provide triphosphites having improved hydrolytic stability. It has also been proposed in the Belgian patent to improve the hydrolytic stability of aryl phosphites by incorporating a small quantity of an amine, such as tri-isopropanolamine therein. As an objection against such an addition, it is stated that an amine is effective only for a short time (page 4, lines 29 to 32). Furthermore, the phosphite stabilized with an amine cannot be used for some purposes such as, for example, in a stabilizer composition for polyvinyl chloride (PVC) which may come in contact with food.

It is therefore an object of the invention to provide an organic triphosphite composition having improved hydrolytic stability. Another object of the invention is to provide compositions containing as the major component an organic triphosphite which is so hydrolytically stable that it can be stored or processed without taking special measures against the effect of moisture, while the nature and quantity of the metal salt to be added can be selected in such a way that, upon incorporation of the composition in question in a stabilizer compound it will not, or practically at all, be noticeable. Still another object of the invention is to provide compositions which can be used in the stabilization of resin compounds which may come in contact with food provided a suitable metal compound is selected for use therewith.

The foregoing objects and others are accomplished in accordance with this invention, generally speaking, by providing hydrolytically stable compositions containing as the essential components
 a. at least about 85% by weight of an organic triphosphite (hereinafter component "(a)", and
 b. from about 0.1% to about 5% by weight of a salt of a metal from Group I or Group II of the Periodic System and an organic acid with at least 8 carbon atoms, hereinafter component "(b)".

Hence, the invention contemplates a method for improving the hydrolytic stability of an organic triphosphite by incorporating component (b) therein as well as the novel composition.

It should be noted, that stabilizer compounds are known from the patent literature, such as British patent Specification Nos. 1,028,414 and 1,180,398, which, among others, contain components (a) and (b). However, the weight ratio among these components differs completely from those of this invention. The most important reason for the presence of component (a) in the disclosed stabilizer compounds is as a complex binder for metal salts. Since the molar ratio of phosphite to metal in these complex compounds is tied to a maximum and it is furthermore of no technical or economic advantage to add an excess of complex-forming substance, the ratio between component (a) and (b) in the known compositions is always smaller than that used in accordance with this invention.

The U.S. Pat. No. 3,755,200, too, describes the composition containing both the component (a) and (b) (column 5, lines 18–32). Not a word is said in it, however, about the possibility of improving the resistance to hydrolysis of component (a) as a result of the presence of component (b).

The only reason for the presence of the latter component consists in that it forms an essential constituent of the stabilizer system described in it.

From the percentage by weight of component (a) being maximized, and the imperative demand that a minimum percentage by weight of a specific solvent (epoxy compound) be present, and the relatively small ratio between the components (a) and (b) in the examples it clearly follows that from this publication there cannot be derived a solution to the problem stated in the present application.

The hydrolytically stable phosphite compositions provided by the present invention are universally usable and can be applied in the most divergent formulations. They are most effective, when both components form a homogeneous solution. For this reason, the metal salt is added in the form of a paraffin solution. Other compounds as well, which frequently occur in stabilizer compositions containing phosphites, such as epoxidized soy bean oil, may be used in order to increase the mutual solubility of components (a) and (b). Those skilled in the art will not find it difficult to select a suitable solvent for every special phosphite and/or metal salt. Apart from that, the possibility naturally remains, to mix the phosphite and metal salt in the solid state, or to suspend the metal salt in the phosphite in finely divided form.

Among the organic triphosphites which can be included advantageously in the compositions pursuant to the invention are those which correspond to one of the structural formulae given below:

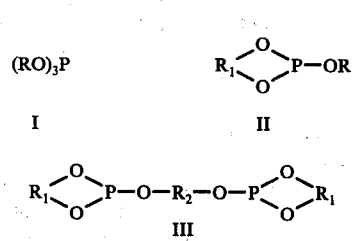

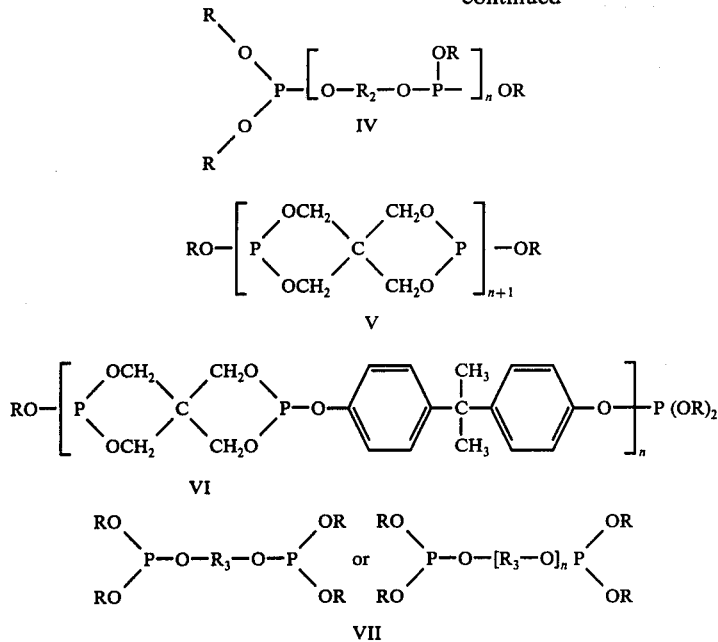

with $n = 0$ or an integer from 1 to 8, and wherein the R's are the same or different and R is an aryl, alkyl, cycloalkyl, aralkyl or alkaryl group, $R_1$ and $R_2$ each represent a divalent group, namely an arylene, cycloalkylene, aralkylene or alkarylene group, and each hydrocarbon contains preferably not more than 18 carbon atoms and may be substituted with an alkoxy or halogen radical, and $R_3$ is a radical derived from a polyol group preferably containing 2 to 6 hydroxyl groups. Examples of suitable polyols are pentaerythritol, propylene glycol, dipropylene glycol, neopentyl glycol, bisphenol A, bisphenol F and the like.

A number of typical examples of phosphites which may fruitfully be used as components in the compositions pursuant to the invention are the following:

diphenyl isodecyl phosphite
diphenyl mono-2-ethylhexyl phosphite
tris(2-ethylhexyl)phosphite
triphenyl phosphite
tris(p-nonylphenyl)phosphite
tricresyl phosphite
tris(octadecyl)phosphite
di-cyclohexyl-2,4-di-t-butylphenyl phosphite
ethylene phenylphosphite
tris($\alpha$-naphthyl)phosphite
benzyl diphenyl phosphite
tris(2-cyclohexylphenyl)phosphite
tris(2-phenylethyl)phosphite
tris(phenylphenyl)phosphite
tetradodecyl-4,4'-isopropylidene diphosphite
tetrakis(nonylphenyl)dipropyleneglycyl diphosphite
bis(nonylphenyl)pentaerythrityl diphosphite
di-n-dodecyl pentaerythrityl diphosphite
di-isodecyl pentaerythrityl diphosphite As already mentioned above, the weight ratio between components (a) and (b) may vary within wide margins. Good hydrolytic stability, accompanied by a minimal quantity of component (b), is always obtained when the weight ratio between components (a) and (b) is between 30 : 1 and 200 : 1, while preference is given to a ratio between about 40 : 1 and 60 : 1. In those cases as well, where the presence of metal soaps is not desirable, such a small quantity in the phosphite will not be harmful, whereas the hydrolytic stability of the phosphite can still be considered amply sufficient.

It has furthermore been found that good results are obtained if a metal salt is used for component (b) that has been derived from a metal and a carboxylic acid with 8 to 12 carbon atoms. In this connection, reference can be made to the characteristics of a branched carboxylic acid, in particular 2-ethyl hexanoic acid. As far as the latter acid is concerned, it is furthermore attractive that the health authorities of most countries permit the use of its salt in various polymers, such as ABS and PVC, that come in contact with food.

Especially favorable results are obtained when component (b) is derived from a carboxylic acid with a branched, aliphatic chain and a quaternary carbon atom. This applies in particular when the carboxylic group of the organic acid is bonded to a quaternary carbon atom. Examples of such acids are:

2-methyl-2-ethyl pentanoic acid
2,2-diethyl-4-methyl pentanoic acid
2,4-dimethyl-2-propyl pentanoic acid
2-methyl-2-propyl hexanoic acid
2,2-diethyl hexanoic acid
2,5-dimethyl-2-ethyl hexanoic acid
2-ethyl 2-propyl heptanoic acid
2,2,5-trimethyl heptanoic acid
2,2-dimethyl octanoic acid
2,2,7-trimethyl octanoic acid, and
2,2-diethyl octanoic acid.

A mixture of acids of this type with on the average of from 9 to 11 carbon atoms is commercially available from Shell Chemie under the trade name "Versatic 911" acid. The salts derived therefrom are known under the name "Versatates". Approximately 90% of this mixture of acids complies with the structural formula given below, wherein $R_1$ and $R_2$ are alkyl groups with a total of 6 to 8 carbon atoms:

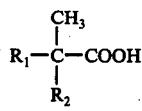

In addition to a carboxylic acid, component (b) may also be derived from a phenol. Favorable results are in particular obtained with an alkylated phenol, such as nonyl phenol.

A mixture of metal salts derived from different acids and/or metals may also be used for component (b). Mixtures of salts derived from a carboxylic acid and a phenol are also possible. In general, such mixtures will not offer any additional advantages. The same can be said of salts derived from di- or multibasic acids.

Although component (b) may be derived from a metal of Group I or Group II, of the Periodic System, it has been found that the best results are obtained with salts derived from metals of Group II. For reasons of health, as well as for reasons of effectiveness, preference is given to calcium or magnesium salts for the metal salt of component (b). Excellent results are in particular obtained when use is made of the calcium or magnesium salts of the above-mentioned "Versatic acids".

The composition pursuant to the invention can be used in any composition where a hydrolytically stable phosphite is desirable. This applies in particular to stabilizer compositions for chlorine-containing resins or copolymers thereof, but also to systems where the presence of larger quantities of metal soaps is less desirable, such as in certain types of polyethylene, polystyrene, SBR, polypropylene, ABS or clear PVC. The compositions pursuant to the invention require so little of component (b), without too great a decline in the hydrolytic stability of the phosphite, that, when used in a certain resin composition, practically no adverse effect occurs.

The invention will now be explained in the following non-limiting examples:

The hydrolytic stability of the triphosphite compositions was determined in accordance with the following procedure:

1. Dilute lye (NaOH) is added drop by drop to a mixture of 100 g water and 50 g isopropanol in an Erlenmeyer flask of 250 ml, until the pH is 7 (read off by means of a pH meter).
2. Five grams of the composition pursuant to the invention, or pure, organic phosphite are added thereto.
3. The Erlenmeyer flask is thereupon quickly placed in a water bath, the temperature of which is held at 50° C + 0.5° C.
4. The pH is measured with a pH meter and the time required for the solution to reach a pH of 6 is determined.

EXAMPLE I

In keeping with the above method of determination, the hydrolytic stability of diphenyl isodecyl phosphite was determined with and without the addition of 1% by weight, referred to the phosphite, of the metal soaps listed below. The metal soaps were added as paraffin solutions. The metal content of these solutions is given in parentheses after the metal salt in question.

| Addition | time between pH 7 and 6 |
| --- | --- |
| None | 10 seconds |
| Magnesium Versatate* (4.5% Mg) | 45 minutes |
| Calcium Versatate* (6.0% Ca) | 30 minutes |
| Calcium naphthenate (6% Ca) | 18 minutes |
| Barium nonylphenate (10% Ba) | 15 minutes |
| Zinc Versatate* (10% Zn) | 7 minutes |
| Sodium Versatate* (4% Na) | 10 minutes |
| Potassium Versatate* (5.5% K) | 5 minutes |

*The "Versatates" used here are salts derived from the "Versatic 911" acids commercially available from Shell, which have already been mentioned above.

When the content of magnesium, or calcium Versatate was doubled, the time measured between pH 7 and 6 was 75 minutes in both cases.

EXAMPLE II

The hydrolytic stability of the phosphites listed below was determined in keeping with the above method of determination, after 2% by weight of calcium Versatate, referred to the weight of the phosphite, had been added thereto. The calcium Versatate was added in the form of a paraffin solution, containing 6% by weight of calcium. The results of the stability test are presented in the table given below.

| | Time between pH 7 and 6 | |
| --- | --- | --- |
| Organic Phosphite | Unstabilized | Stabilized |
| Dicyclohexyl-2,4-di-t-butylphenyl phosphite | 5–10 seconds | 4 hours |
| Diphenyl-2-ethylhexyl phosphite | 15 seconds | 4.5 hours |
| Tri-isodecyl phosphite | 30 seconds | 35 hours |
| Tris-(nonylphenol) phosphite | 15 seconds | 4.25 hours |
| Tetra-n-dodecyl bisphenol-A diphosphite | 12 minutes | 25 hours |

EXAMPLE III

In the example given below it is shown that the hydrolytic stability of the compositions pursuant to the invention remains constant during storage. Three separate samples of phenyl diisodecyl phosphite were prepared for this purpose, each of which was stabilized separately with a solution containing 2% by weight of calcium Versatate, calculated on the basis of the phosphite (the calcium Versatate solution in paraffin contained 6% by weight of calcium).

Subsequently, the hydrolytic stability of each sample was measured at intervals of several weeks. The unstabilized samples displayed a hydrolysis time corresponding to 15 seconds pursuant to the above method of determination.

The time required by the stabilized samples to reach a pH of 6 is shown in the table given below.

| | Time between pH 7 and 6, in Hours | | |
| --- | --- | --- | --- |
| Storage Time | Sample 1 | Sample 2 | Sample 3 |
| 3 weeks | 6.25 | 5.25 | 6.25 |
| 6 weeks | 6.0 | 5.25 | 5.75 |
| 3 months | 5.75 | 6.0 | 6.25 |

EXAMPLE IV

In this example it is shown, that the stabilizing effect in PVC of the compositions pursuant to the invention, which mainly contain phosphite, is independent from the conditions under which they are stored. This is in contrast to the stabilizing effect of the same, unstabilized phosphites, which appears to be strongly dependent upon the conditions under which they were kept. For this purpose, stabilized, as well as unstabilized phosphite was for 24 hours stored in an oven at 70° C which was filled with water vapor. The phosphites were subsequently incorporated in a certain PVC formulation which was tested for heat stability. The result of this experiment was compared with the stabilizing effect of the same phosphite (stabilized, as well as unstabilized), which had not been exposed to a humid atmosphere.

The experiments were carried out as follows: first, the various constituents according to the formulation given below were mixed for 5 minutes at 155° C on a laboratory roller mill consisting of two rollers, until the mixture was completely homogeneous. The required samples were cut from the sheet emerging from the rollers with a thickness of 0.125 cm. These samples were heated to 185° C in an oven with air circulation and removed therefrom at intervals of 10 minutes, whereupon they were evaluated visually for color changes. The results are shown in the table given below, whereby the following scale was used for the color change:

| 1 = colorless | 2 = somewhat light yellow | 3 = light yellow |
|---|---|---|
| 4 = yellow | 5 = dark yellow | 6 = brown |
| 7 = dark brown | 8 = black | |

The following two organic triphosphites were tested:
phosphite A = diphenyl isodecyl phosphite
phosphite B = dicyclohexyl-2,4-di-t-butylphenol phosphite Both compounds were used as such, as well as stabilized with a solution of calcium Versatate in paraffin, which contained 6% by weight of calcium, the quantity of calcium Versatate amounting to 2% by weight of the phosphite. The composition of the PVC formulation was as follows:

| | |
|---|---|
| PVC (K value 65) | 100 parts by weight |
| dioctyl phthalate | 47 parts by weight |
| epoxidated soy oil | 3 parts by weight |
| Interstab M 255 (a calcium/zinc stabilizer commercially available from Akzo Chemie) | 0.5 parts by weight |
| organic phosphite | 2 parts by weight |

TABLE

| stabilized | Phosphite A | | | | Phosphite B | | | |
|---|---|---|---|---|---|---|---|---|
| | no | | yes | | no | | yes | |
| treated with water vapor at 70° C | no | yes | no | yes | no | yes | no | yes |
| time (min) color | | | | | | | | |
| 0 | 1 | 2 | 1 | 1 | 1 | 2 | 1 | 1 |
| 10 | 1 | 2 | 1 | 1 | 1 | 2 | 1 | 1 |
| 20 | 1 | 3 | 1 | 1 | 1 | 3 | 1 | 1 |
| 30 | 1 | 4 | 1 | 1 | 1 | 4 | 1 | 1 |
| 40 | 1 | 5 | 1 | 1 | 1 | 4 | 1 | 1 |
| 50 | 2 | 7 | 2 | 2 | 2 | 5 | 2 | 2 |
| 60 | 2 | 8 | 2 | 2 | 3 | 5 | 3 | 3 |
| 70 | 3 | | 3 | 2 | 4 | 5 | 4 | 3 |
| 80 | 3 | | 3 | 3 | 4 | 5 | 4 | 3 |
| 90 | 8 | | 8 | 8 | 7 | 7 | 7 | 7 |
| 100 | | | | | 8 | 8 | 8 | 8 |

The table shows clearly, that the conditions under which the phosphite compositions pursuant to the invention had been stored have no influence whatsoever on their stabilizing effect in PVC.

Although the invention is described in detail for the purpose of illustration, it is to be understood that such detail is solely for that purpose and that variations can be made therein by those skilled in the art without departing from the spirit and scope of the invention except as it may be limited by the claims.

I claim:

1. A method of improving the hydrolytic stability of an organic triphosphite which comprises mixing the triphosphite with a stabilizing amount of a salt of a metal of Group I or II of the Periodic System and an organic acid having at least 8 carbon atoms.

2. The method of claim 1 wherein the said salt of a metal is a calcium or magnesium salt.

3. A composition containing as its essential components
    (a) at least about 85% by weight of an organic triphosphite, and
    (b) from about 0.1 to about 5% by weight of the salt of a metal from Groups I and II of the Periodic System and an organic acid with at least 8 carbon atoms,
the weight ratio between components (a) and (b) being between 30 : 1 and 200 : 1.

4. The composition of claim 3 wherein the organic triphosphite is a compound corresponding to one of the following structural formulae:

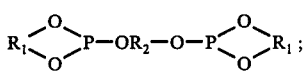

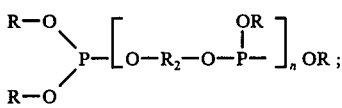

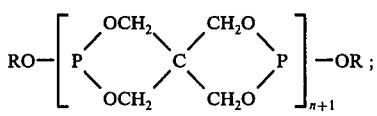

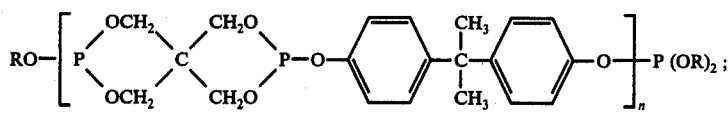

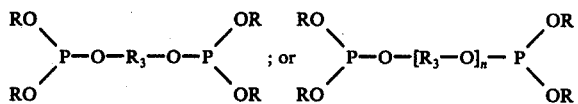

wherein $n = 0$ or an integer of from 1 to 8, and wherein the R's are the same or different and R is an aryl, alkyl, cycloalkyl, aralkyl or alkaryl group, $R_1$ and $R_2$ each represent a divalent arylene, cycloalkylene, aralkylene or alkarylene group, and $R_3$ is a radical derived from a polyol group.

5. The composition of claim 3 wherein component (b) is the metal salt of a carboxylic acid with 8 to 12 carbon atoms.

6. The composition of claim 5 wherein the carboxylic acid is 2-ethyl hexanoic acid.

7. The composition of claim 5 wherein the carboxylic acid has a branched, aliphatic chain with a quaternary carbon atom.

8. The composition of claim 7 wherein the carboxyl group of the organic acid is bonded to a quaternary carbon atom.

9. The composition of claim 3 wherein component (b) is the metal salt of a phenol.

10. The composition of claim 9 wherein the phenol contains an alkyl group with 1 to 18 carbon atoms.

11. The composition of claim 10 wherein the alkyl phenol is nonyl phenol.

12. The composition of claim 3 wherein a metal from Group II of the Periodic System is used for the metal salt.

13. The composition of claim 12 wherein the metal salt is a calcium or magnesium salt.

14. The composition of claim 3 wherein component (b) is a magnesium or calcium salt of a mixture of carboxylic acids having a branched aliphatic chain and a quaternary carbon atom.

15. The composition of claim 3 wherein component (b) is the magnesium or calcium salt of 2-ethyl hexanoic acid.

16. The composition of claim 3 wherein the weight ratio between components (a) and (b) is between 40 : 1 and 60 : 1.

* * * * *